(12) United States Patent
Nakamura

(10) Patent No.: US 11,319,426 B2
(45) Date of Patent: May 3, 2022

(54) MAGNESIUM CARBONATE

(71) Applicant: KONOSHIMA CHEMICAL CO., LTD., Osaka (JP)

(72) Inventor: Masashi Nakamura, Kagawa (JP)

(73) Assignee: KONOSHIMA CHEMICAL CO., LTD., Osaka (JP)

( * ) Notice: Subject to any disclaimer, the term of this patent is extended or adjusted under 35 U.S.C. 154(b) by 335 days.

(21) Appl. No.: 16/605,908

(22) PCT Filed: Apr. 25, 2018

(86) PCT No.: PCT/JP2018/016773
§ 371 (c)(1),
(2) Date: Oct. 17, 2019

(87) PCT Pub. No.: WO2018/199151
PCT Pub. Date: Nov. 1, 2018

(65) Prior Publication Data
US 2020/0131329 A1    Apr. 30, 2020

(30) Foreign Application Priority Data

Apr. 28, 2017 (JP) .............................. JP2017-089923

(51) Int. Cl.
*C08K 3/26* (2006.01)
*C01F 5/24* (2006.01)
*C08F 14/06* (2006.01)

(52) U.S. Cl.
CPC .................. *C08K 3/26* (2013.01); *C01F 5/24* (2013.01); *C08F 14/06* (2013.01); *C01P 2004/50* (2013.01); *C01P 2004/61* (2013.01); *C01P 2006/12* (2013.01); *C01P 2006/16* (2013.01); *C01P 2006/90* (2013.01); *C08K 2003/267* (2013.01); *C08K 2201/005* (2013.01); *C08K 2201/006* (2013.01)

(58) Field of Classification Search
CPC ................ C08K 3/26; C08K 2201/006; C08K 2003/267; C08K 2201/005; C01F 5/24; C08F 14/06; C01P 2006/12; C01P 2006/90; C01P 2004/61; C01P 2004/50; C01P 2006/16
USPC ......................................................... 524/424
See application file for complete search history.

(56) References Cited

U.S. PATENT DOCUMENTS

| 3,993,607 | A | * | 11/1976 | Florence | .................. | C08K 3/22 |
| | | | | | | 521/140 |
| 2005/0129606 | A1 | * | 6/2005 | Mitsuhashi | ............. | A23L 27/77 |
| | | | | | | 423/430 |
| 2017/0077494 | A1 | | 3/2017 | Iwasaki et al. | | |

FOREIGN PATENT DOCUMENTS

| CN | 104194233 | | 6/2016 | | |
| EP | 0460923 | A2 * | 12/1991 | ................ | C01F 5/24 |
| EP | 3 145 005 | | 3/2017 | | |
| JP | 2003-113533 | | 4/2003 | | |
| JP | 2003-306325 | | 10/2003 | | |
| JP | 2004-059378 | | 2/2004 | | |
| JP | 2005-220082 | | 8/2005 | | |
| JP | 2005-272752 | | 10/2005 | | |
| WO | 2017/043588 | | 3/2017 | | |

OTHER PUBLICATIONS

Extended European Search Report dated Apr. 6, 2020 in corresponding European Patent Application No. 18790047.7.
International Search Report dated Jul. 10, 2018 in International Application No. PCT/JP2018/016773.
English-language translation of the International Preliminary Report on Patentability dated Oct. 29, 2019 in International (PCT) Patent Application No. PCT/JP2018/016773.

* cited by examiner

*Primary Examiner* — Hui H Chin
(74) *Attorney, Agent, or Firm* — Wenderoth, Lind & Ponack, L.L.P.

(57) ABSTRACT

Provided is a novel magnesium carbonate. The magnesium carbonate has a zeta potential of 5 mV or more and a BET specific surface area of 25 m²/g or more. Such a magnesium carbonate can be used as a resin additive, etc.

10 Claims, No Drawings

MAGNESIUM CARBONATE

TECHNICAL FIELD

The present invention relates to a novel magnesium carbonate.

BACKGROUND ART

Magnesium carbonate is widely used in various industrial fields, such as pharmaceutical products, cosmetics, foods and construction materials. Magnesium carbonate used as a filler has also been reported.

Patent Literature 1 (JP 2005-272752 A), for example, discloses use of anhydrous magnesium carbonate with a BET specific surface area of 1 to 15 m$^2$/g and an average particle size of 1 to 10 μm as a filler for engineering plastics.

CITATION LIST

Patent Literature

Patent Literature 1: JP 2005-272752 A (Claims and Examples)

SUMMARY OF INVENTION

Technical Problem

An object of the present invention is to provide a novel magnesium carbonate.

Solution to Problem

Magnesium carbonate is known to be used as a filler for engineering plastics and other products as disclosed in Patent Literature 1.

The inventor has conducted detailed studies on magnesium carbonate as a filler. The inventor has found during research that some types of magnesium carbonate reduce the transparency of products and are inapplicable to applications that require transparency. Even in cases where products are not required to be transparent, some types of magnesium carbonate impair the appearance of products or adversely affect the coloring properties of products.

Based on these findings, the inventor has carried out intensive studies and found that, when magnesium carbonate is used as a filler for products, specific physical properties of magnesium carbonate influence the transparency of the products. The inventor has conducted further studies and completed the present invention.

That is, the present invention provides a magnesium carbonate having a zeta potential of 5 mV or more (for example, 6 to 25 mV). The magnesium carbonate may have a BET specific surface area of 25 m$^2$/g or more (for example, 28 m$^2$/g or more).

The magnesium carbonate of the present invention may have a mercury intrusion volume of about 1 to 8 cc/g and an average particle size of about 1 to 20 μm.

The magnesium carbonate typically has a zeta potential of 7 to 20 mV, a BET specific surface area of 30 m$^2$/g or more (for example, 30 to 70 m$^2$/g), a mercury intrusion volume of 1.5 to 5 cc/g and an average particle size of 2 to 15 μm.

The magnesium carbonate of the present invention may have plate-like structure. In particular embodiments, the magnesium carbonate may be aggregates with a card-house structure [or in the form of aggregates with a card-house structure (or in the form of a card-house structure)].

The present invention includes the following.
(1) A magnesium carbonate having a zeta potential of 5 mV or more and a BET specific surface area of 25 m$^2$/g or more.
(2) The magnesium carbonate according to the above (1), wherein the zeta potential is 6 to 25 mV and the BET specific surface area is 28 m$^2$/g or more.
(3) The magnesium carbonate according to the above (1) or (2), which has a mercury intrusion volume of 1 to 8 cc/g.
(4) The magnesium carbonate according to any one of the above (1) to (3), which has an average particle size of 1 to 20 μm.
(5) The magnesium carbonate according to any one of the above (1) to (4), wherein the zeta potential is 7 to 20 mV, the BET specific surface area is 30 to 70 m$^2$/g, the mercury intrusion volume is 1.5 to 5 cc/g, and the average particle size is 2 to 15 μm.
(6) The magnesium carbonate according to any one of the above (1) to (5), which is in the form of aggregates with a card-house structure.
(7) A magnesium carbonate used as a resin additive, the magnesium carbonate having a zeta potential of 5 mV or more.
(8) The magnesium carbonate according to the above (7), wherein the resin additive is a filler.
(9) The magnesium carbonate according to the above (7) or (8), which has a BET specific surface area of 10 m$^2$/g or more.
(10) The magnesium carbonate according to any one of the above (7) to (9), which has a mercury intrusion volume of 1 to 8 cc/g.
(11) The magnesium carbonate according to any one of the above (7) to (10), which has an average particle size of 1 to 20 μm.
(12) The magnesium carbonate according to any one of the above (7) to (11), wherein the zeta potential is 6 to 25 mV, the BET specific surface area is 15 to 70 m$^2$/g, the mercury intrusion volume is 1.5 to 5 cc/g, and the average particle size is 2 to 15 μm.
(13) The magnesium carbonate according to any one of the above (7) to (12), which is in the form of aggregates with a card-house structure.
(14) A composition comprising a resin and the magnesium carbonate according to any one of the above (1) to (13).
(15) The composition according to the above (14), wherein the resin comprises a vinyl chloride resin.
(16) The composition according to the above (14), wherein the resin comprises a rubber.
(17) The composition according to any one of the above (14) to (16), wherein the proportion of the magnesium carbonate is 0.1 part by mass or more based on 100 parts by mass of the resin.

Advantageous Effects of Invention

The present invention provides a novel magnesium carbonate.

The magnesium carbonate can be used for various applications and is especially useful as a resin additive (including a filler) etc.

Addition of the magnesium carbonate of the present invention to a resin does not impair but maintains high transparency of the resin (or only slightly reduces the transparency of the resin) in most cases. The magnesium carbonate of the present invention maintains the transparency of products and at the same time functions as a filler, and is thus very useful and practical.

DESCRIPTION OF EMBODIMENTS

Magnesium Carbonate

The magnesium carbonate of the present invention satisfies specific physical properties and specific characteristics. Typically, the magnesium carbonate of the present invention at least satisfies a specific range of zeta potential. The magnesium carbonate may satisfy a specific range of zeta potential and a specific range of other physical properties (for example, at least one physical property selected from a specific surface area, a mercury intrusion volume and an average particle size) (in particular, the magnesium carbonate may satisfy at least a specific range of specific surface area).

The zeta potential of the magnesium carbonate can be selected from, for example, the range of 3 mV or more. The zeta potential may be 5 mV or more (for example, 5.5 to 30 mV), preferably 6 mV or more (for example, 6 to 25 mV), more preferably 6.5 mV or more (for example, 6.5 to 22 mV), and particularly preferably 7 mV or more (for example, 7 to 20 mV). The zeta potential may also be about 7.5 mV or more {for example, 8 mV or more (for example, 8.3 to 25 mV), 8.5 mV or more (for example, 8.8 to 20 mV), or 9 mV or more (for example, 9 to 18 mV)}.

The upper limit of the range of the zeta potential of the magnesium carbonate is not limited to a particular value, and may be, for example, at most 30 mV, 25 mV, 22 mV, 20 mV, 18 mV, 16 mV, 15 mV, 14 mV, or 13 mV. The upper and lower limits can be selected as appropriate to set the range of the zeta potential (for example, 8 to 18 mV; the same is applied hereinafter).

The magnesium carbonate with the above range of zeta potential may have well-balanced properties, including the ability to maintain the transparency of products. If the zeta potential of a magnesium carbonate is excessively low, the repulsive force between magnesium carbonate microparticles may be low, and the particles may aggregate and be poorly dispersed in a resin, which may result in reduced transparency of the resin. On the other hand, if the zeta potential of a magnesium carbonate is excessively high, the dispersibility of magnesium carbonate microparticles in a resin may be excellent, but the microparticles may, for example, absorb much moisture, which may result in deterioration in the physical properties of other components (a resin etc.) besides the magnesium carbonate.

The zeta potential may be determined by any method and can be determined by, for example, the method described later.

The BET specific surface area of the magnesium carbonate can be selected from, for example, the range of 1 $m^2/g$ or more (for example, 5 $m^2/g$ or more, or 10 $m^2/g$ or more) and typically selected from the range of 20 $m^2/g$ or more (for example, 22 $m^2/g$ or more). The BET specific surface area may be 25 $m^2/g$ or more (for example, 28 $m^2/g$ or more, or 29 $m^2/g$ or more), preferably 30 $m^2/g$ or more (for example, 32 $m^2/g$ or more), and more preferably 35 $m^2/g$ or more (for example, 38 $m^2/g$ or more), and can be 40 $m^2/g$ or more.

The upper limit of the range of the BET specific surface area of the magnesium carbonate is not limited to a particular value, and may be, for example, at most 100 $m^2/g$, 90 $m^2/g$, 80 $m^2/g$, 70 $m^2/g$, 65 $m^2/g$, 60 $m^2/g$, 55 $m^2/g$, 50 $m^2/g$, or 45 $m^2/g$.

The magnesium carbonate with the above range of specific surface area (especially when having the above zeta potential) is advantageous in terms of maintaining the transparency of products and improving the strength of products.

If the specific surface area of a magnesium carbonate is excessively small or large, magnesium carbonate particles may be too large or may aggregate (re-aggregate), which may result in reduced transparency of products.

The BET specific surface area may be determined by any method and can be determined by, for example, the single point method in accordance with JIS 8830 (Determination of the specific surface area of powders (solids) by gas adsorption-BET method).

The mercury intrusion volume of the magnesium carbonate may be 0.1 cc/g or more, or may be, for example, 0.5 cc/g or more (for example, 0.8 to 20 cc/g), preferably 1 cc/g or more (for example, 1.2 to 15 cc/g), and more preferably 1.5 cc/g or more (for example, 1.6 to 10 cc/g). The mercury intrusion volume may typically be 1 to 8 cc/g (for example, 1.2 to 7 cc/g, 1.3 to 6 cc/g, or 1.5 to 5 cc/g), or may be 4 cc/g or less (for example, 4 cc/g or less, 3.5 cc/g or less, 3 cc/g or less, or 2.5 cc/g or less).

The magnesium carbonate with the above mercury intrusion volume (especially when having the above zeta potential and/or the above specific surface area) has higher dispersibility in a resin or other materials and is advantageous in terms of maintaining the transparency of a resin or other products and improving the strength of a resin or other products. Probably due to its appropriate bulkiness, the magnesium carbonate is advantageous in terms of handling, for example, when mixed with a resin or other materials.

The mercury intrusion volume may be determined by any method and can be determined by, for example, the method described later.

The magnesium carbonate may be in the form of particles (granules or a powder). The shape of particles is not limited to a particular one, and the particles may be in a spherical shape (an approximately spherical shape), a plate shape, etc. The particles may be primary particles or secondary particles (or aggregates). The magnesium carbonate particles may be plate-shaped particles, and may preferably be aggregates of plate-shaped particles (card-house aggregates, a card-house structure, or aggregates with a card-house structure).

The average particle size (or the secondary particle size) of the particulate magnesium carbonate (magnesium carbonate particles) may be selected from the range of about 100 μm or less (for example, 70 μm or less). The average particle size (or the secondary particle size) may be 50 μm or less (for example, 40 μm or less), preferably 30 μm or less (for example, 25 μm or less), and more preferably 20 μm or less (for example, 18 μm or less). The average particle size (or the secondary particle size) may typically be 1 to 20 μm (for example, 1.5 to 18 μm, 2 to 15 μm, 3 to 12 μm, 3.5 to 10 μm, 4 to 9 μm, or 4.5 to 8 μm), or may be 12 μm or less (for example, 10 μm or less, or 8 μm or less).

The magnesium carbonate with the above average particle size (especially when having the above zeta potential and other properties) is advantageous in terms of maintaining the transparency of products.

The average particle size may be determined by any method and can be determined by, for example, the method described later.

The magnesium carbonate of the present invention may be any type that contains $MgCO_3$, but may typically be a basic magnesium carbonate. The magnesium carbonate (basic magnesium carbonate) may be a hydrate or a hydrated compound (for example, a dihydrate, a trihydrate, a pentahydrate, etc.).

The basic magnesium carbonate may be a hydromagnesite including those represented by the following formula:

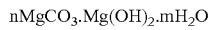

$nMgCO_3 \cdot Mg(OH)_2 \cdot mH_2O$

[wherein m and n are an integer (for example, m and n each represent 3 to 8, or m=n=4, or n=4 and m=5, or the like)].

A hydromagnesite with a large number of carbonic acid groups has a low zeta potential, whereas a hydromagnesite having a large number of hydroxy groups tends to be positively charged.

The apparent specific gravity of the magnesium carbonate may be, for example, 0.10 to 0.50, preferably 0.15 to 0.45, and more preferably about 0.20 to 0.40.

The magnesium carbonate may contain an additional element (or an additional compound) as long as it contains $MgCO_3$ (and $Mg(OH)_2$ and $H_2O$), or may contain no additional elements. Examples of the additional element include, but are not limited to, non-metallic elements [for example, C (carbon), S (sulfur), and halogens (for example, Cl (chlorine) etc.) etc.] and metallic elements or metalloid elements [for example, main group metal elements (for example, alkali or alkaline earth metals such as Na (sodium) and Ca (calcium); Group 13 elements in the periodic table, such as B (boron) and Al (aluminum); Si (silicon); etc.), transition metal elements (for example, Fe (iron), Zn (zinc), etc.), etc.]. A single type of element may be contained in the magnesium carbonate, or a combination of two or more elements may be contained in the magnesium carbonate.

When the magnesium carbonate contains S, the amount (proportion) of S may be, for example, 0.6% by mass or less (for example, 0.01 to 0.6% by mass), preferably 0.5% by mass or less (for example, 0.01 to 0.3% by mass), and more preferably 0.2% by mass or less (for example, 0.01 to 0.2% by mass).

When the magnesium carbonate contains Na, the amount (proportion) of Na may be, for example, 1.0% by mass or less (for example, 0.01 to 1% by mass), preferably 0.5% by mass or less (for example, 0.01 to 0.5% by mass), and more preferably 0.3% by mass or less (for example, 0.01 to 0.3% by mass).

When the magnesium carbonate contains Ca, the amount (proportion) of Ca may be, for example, 1.0% by mass or less (for example, 0.01 to 1.0% by mass), preferably 0.7% by mass or less (for example, 0.01 to 0.7% by mass), and more preferably 0.5% by mass or less (for example, 0.01 to 0.5% by mass).

The magnesium carbonate may be produced by any method, and may be produced by, for example, blowing carbon dioxide gas into a magnesium hydroxide slurry or a magnesium oxide slurry.

The slurry can be prepared by, for example, dispersing powdery magnesium hydroxide or magnesium oxide in water.

The completion of the reaction (formation of magnesium carbonate) may be confirmed by, for example, determining whether the reaction solution reaches a predetermined pH (for example, about 10 or less). The pH may be determined with an indicator (a phenolphthalein solution etc.).

The produced magnesium carbonate can be separated (purified) by the conventional method. For example, after completion of the reaction, the magnesium carbonate produced by blowing of carbon dioxide gas may be purified by filtering, dehydrating and drying the slurry.

The resulting magnesium carbonate may be subjected to pulverization process. The type and degree of pulverization can be selected as appropriate depending on the desired average particle size etc.

The zeta potential of the magnesium carbonate may be adjusted by adjusting the drying temperature etc. For example, magnesium carbonate dried at a higher temperature tends to have a higher zeta potential.

The specific surface area and the average particle size may be adjusted by, for example, adjusting the curing degree of the magnesium carbonate slurry, etc. For example, magnesium carbonate cured at a higher temperature tends to have a smaller specific surface area and a smaller average particle size.

The mercury intrusion volume may be adjusted by adjusting the pressure for dehydration (for example, pressing pressure of a filter press). Magnesium carbonate dehydrated at a lower pressure tends to have a higher mercury intrusion volume.

The average particle size may be adjusted by adjusting the degree of pulverization etc.

Use of Magnesium Carbonate

The magnesium carbonate of the present invention may be used for any purpose and various applications (including, for example, as an ingredient or a component of paints, fertilizers, foods, cosmetics, ceramics, pharmaceutical products, etc.).

The magnesium carbonate of the present invention may be suitably used as an additive for resins. That is, the magnesium carbonate of the present invention may be a component of a composition (resin composition).

The magnesium carbonate when used as a resin additive [for example, a filler (a bulking agent, a reinforcement, a reinforcing agent, or an enhancing agent)] can enhance (improve) or impart various physical properties/functions [for example, strength, rigidity (modulus) and/or heat resistance]. The magnesium carbonate can be used to increase the volume of a resin. The magnesium carbonate can also reduce the cost when mixed with some types of resins.

Accordingly, the present invention also includes a composition comprising a resin and the magnesium carbonate.

The resin is not limited to particular one, and may be a thermoplastic resin or a curable resin (for example, a thermosetting or photocurable resin), or may be an elastomer (a thermoplastic elastomer, a rubber, etc.).

The resin may be a single type or a combination of two or more types.

Specific examples of the resin (including a rubber) include olefin resins (for example, polyethylene, polypropylene, an ethylene-propylene copolymer, etc.), halogen-containing resins {for example, chlorine-containing resins [such as vinyl chloride resins (for example, polyvinyl chloride, a vinyl chloride-vinyl acetate copolymer, an ethylene-vinyl chloride copolymer, an ethylene-vinyl acetate copolymer, etc.), vinylidene chloride resins (polyvinylidene chloride etc.) etc.] etc.}, (meth)acrylic resins (for example, polymethyl methacrylate, a methyl methacrylate-styrene copolymer, etc.), styrene resins [for example, polystyrene, a styrene copolymer, styrene-containing resins (an acrylonitrile-styrene copolymer, a styrene-methyl methacrylate copolymer, an ABS resin, etc.) etc.], polyester resins [for example, polyalkylene arylate resins such as polyalkylene terephthalates (polyethylene terephthalate, polypropylene terephthalate, polybutylene terephthalate, polycyclohexanedimethylene terephthalate, etc.) and polyethylene naphthalate; and polyarylate resins], polycarbonate resins (for example, bisphenol A polycarbonate), polythiocarbonate resins, polyacetal resins, polyamide resins (for example, polyamide 6 and polyamide 66), polyphenylene ether resins, polyetherketone resins, polysulfone resins, polyphenylene sulfide resins, polyimide resins, thermoplastic elastomers (olefin elastomers, styrene elastomers, polyester elastomers, polyamide elastomers, polyurethane elastomers, etc.), epoxy resins, phenol resins, urea resins, melamine resins, furan resins, unsaturated polyester resins, diallyl phthalate resins, vinyl ester resins, silicone resins, and rubbers.

Examples of the rubber include diene rubbers {for example, natural rubber (NR), isoprene rubber (IR), butyl rubber (IIR), butadiene rubber (BR), chloroprene rubber (CR), nitrile-containing rubbers [such as nitrile rubber (NBR), nitrile chloroprene rubber (NCR), and nitrile isoprene rubber (NIR)], styrene-containing rubbers [such as styrene-butadiene rubber (SBR), styrene chloroprene rubber (SCR), and styrene isoprene rubber (SIR)], hydrogenated rubbers [such as hydrogenated nitrile rubber (HNBR)], etc.}, olefin rubbers [for example, ethylene-propylene rubber (EPM), ethylene propylene diene rubber (EPDM), etc.], acrylic rubbers (ethylene acrylic rubber etc.), fluororubbers, urethane rubbers, and acid-modified rubbers (for example, carboxylated nitrile rubber (X-NBR), carboxylated styrene-butadiene rubber (X-SBR), carboxylated ethylene-propylene rubber (X-EP(D)M), etc.).

Preferred are olefin resins, halogen-containing resins, and rubbers, and particularly preferred are vinyl chloride resins and rubbers.

The magnesium carbonate, when added to such a resin (rubber), generally only slightly reduces the transparency of the resin (rubber). Therefore, the magnesium carbonate can be used for applications that require transparency of products. The magnesium carbonate only slightly influences the appearance or coloring of products, and can therefore be used for applications that require good appearance or design.

When the magnesium carbonate is added to (mixed with) a resin, the proportion of the magnesium carbonate can be selected as appropriate depending on, for example, the intended function or the degree of the function. The proportion of the magnesium carbonate may be, but is not limited to, for example, 0.1 parts by mass or more (for example, 0.3 to 1000 parts by mass), preferably 0.5 parts by mass or more (for example, 1 to 500 parts by mass), and more preferably 2 parts by mass or more (for example, about 3 to 300 parts by mass) based on 100 parts by mass of the resin.

In particular when the magnesium carbonate is added to a resin such as an olefin resin and a halogen-containing resin (including a vinyl chloride resin), the proportion of the magnesium carbonate may be, for example, 0.1 to 100 parts by mass, preferably 0.5 to 80 parts by mass, more preferably 1 to 50 parts by mass (for example, 2 to 30 parts by mass), and particularly preferably 3 to 25 parts by mass (for example, 3.5 to 20 parts by mass, 4 to 15 parts by mass, or 5 to 10 parts by mass), or may be 4 parts by mass or more (for example, 5 parts by mass or more, 6 parts by mass or more, 7 parts by mass or more, or 8 parts by mass or more) based on 100 parts by mass of the resin (an olefin resin, a halogen-containing resin, etc.).

In particular when the magnesium carbonate is added to a rubber, the proportion of the magnesium carbonate may be, for example, 1 part by mass or more (for example, 1 to 1000 parts by mass), preferably 5 parts by mass or more (for example, 6 to 500 parts by mass), more preferably 8 parts by mass or more (for example, 10 to 300 parts by mass), and particularly preferably 15 parts by mass or more (for example, 20 to 200 parts by mass), or may be 30 parts by mass or more (for example, 40 parts by mass or more, 50 parts by mass or more, 60 parts by mass or more, or 80 parts by mass or more) based on 100 parts by mass of the resin (rubber).

The composition of the present invention may contain a common additive depending on the type of resin (rubber), the application of the composition, etc. Examples of the common additive include plasticizers, fire retardants, softeners, stabilizers, antistatic agents, aging inhibitors, antioxidants, ultraviolet absorbers, tackifiers, lubricants, coloring agents, foaming agents, dispersants, and fillers (other fillers besides the magnesium carbonate). These additives may be used alone or in combination of two or more thereof.

The composition can be produced by blending ingredients. The blending method can be selected as appropriate depending on the type of resin and is not limited to particular one.

EXAMPLES

The present invention will be described below in further detail with reference to Examples, but the present invention is not limited thereto. Many modifications can be made by a person skilled in the art within the spirit of the invention.

Various physical properties and characteristics were determined and evaluated as follows.

Zeta potential: To 10 g of magnesium carbonate in a beaker, pure water was added to a total volume of 200 mL. The mixture was stirred with a stirring rod about 20 times to give a homogeneous liquid. The liquid was continuously stirred while maintaining the temperature at 25° C. to give a slurry liquid. Slurry concentration: 0.05 g/cm$^3$. Measurement method: colloid vibration current method. Measurement device: DT-1200 (Dispersion Technology Inc.). Measurement was performed three times, and the mean value was calculated and reported as the zeta potential value.

BET specific surface area: The BET specific surface area was determined by the single point method in accordance with JIS 8830 (Determination of the specific surface area of powders (solids) by gas adsorption-BET method).

Mercury intrusion volume: PoreMaster-60 manufactured by Quantachrome was used as a measurement device.

A mass of 0.1 g of magnesium carbonate was weighed and filled into a 0.5-mL cell stem.

Measurement was performed first in the low-pressure chamber. Then the sample was taken out, and measurement was performed in the high-pressure chamber. The measurement results were processed by the software attached to the measurement device to calculate the volume of mercury intrusion.

Range of measurement: 1069 to 0.0036 μm diameter
Contact angle of mercury: 140°
Surface tension of mercury: 480 dynes/cm
Density of mercury: 13.5 g/cc
Temperature: 20° C.
Measuring Conditions Under High Pressure
Penetrometer Constant: 1520 [mV/cc]
Auto-Oil Fill Time: 5 [sec]
Run Mode: fixed Speed
Motor Speed: 4
Measuring Conditions Under Low Pressure
Penetrometer Constant: 1760 [mV/cc]
Evacuation Rate: 1
Fine Evac. Until: 500.0000 [mmHg]
Coarse Evac. Until: 5.0000 [min.]

Average particle size: 0.05 g of a sample powder was added to 50 mL of ethanol, dispersed by sonication for 3 minutes, and subjected to measurement by the laser diffraction method (apparatus: Microtrac HRA, NIKKISO CO., LTD.).

L* value (lightness): A sheet prepared as described later was placed on a black standard plate (with an L* value of 25.9 as measured alone in the SCI mode). The sheet and the black standard plate were securely held against the aperture of a spectrophotometer so that the light from the spectrophotometer did not leak. The L* value of the sheet was measured in the SCI mode. During the measurement, the sheet was positioned to face the aperture.

The spectrophotometer "CM-3610d" manufactured by KONICA MINOLTA, INC. was used for the measurement.

Since the sheet was placed on the black standard plate in this measurement, the sensor detected the black color that transmitted through the sheet. A greater transparency of the sheet is indicated by a lower L* value.

100% modulus: A test specimen of the JIS No. 3 dumbbell shape was used for the measurement. Tensile test was performed in accordance with JIS K 7161. The tensile speed was 200 mm/min. The tensile stress at 100% elongation was reported as 100% modulus.

Appearance of sheet: The appearance of a sheet was visually inspected based on the following criteria.
Excellent: no mottled pattern is observed.
Good: a slightly mottled pattern is observed.
Poor: a highly mottled pattern is observed.

Transparency of sheet: The transparency of a sheet was visually inspected based on the following criteria.
Excellent: letters on paper under the sheet are clearly readable.
Good: letters on paper under the sheet are readable.
Poor: no letters on paper under the sheet are readable.

Hardness: Three sheets of 2 mm thickness each were stacked on top of each other, and the hardness of the stacked sheets was determined with a durometer (type A) in accordance with JIS K 6253.

Example 1

A magnesium oxide powder was added to pure water to a MgO concentration of 40 g/L to give 3 L of a slurry. The slurry was warmed to 60° C., and carbon dioxide gas was blown into the stirred slurry at a flow rate of 2 L/min to allow a reaction to occur. The reaction was monitored to determine the endpoint. The end point was determined by adding phenolphthalein to the slurry. The end point was when the color of the slurry was changed from pink to colorless. After the reaction reached the end point, the blowing of the gas was stopped to give a basic magnesium carbonate slurry. The basic magnesium carbonate slurry was warmed to a liquid temperature of 80° C. and stirred at the temperature for 6 hours.

The basic magnesium carbonate slurry was dehydrated with a filter press at 2.0 MPa for 3 minutes, placed in a dryer set at 135° C. and dried for 12 hours. The dried product was pulverized with Bantam Mill (type AP-B) manufactured by Hosokawa Micron Corporation to give a basic magnesium carbonate powder.

The magnesium carbonate had a zeta potential of 12.4 mV and a BET specific surface area of 42 $m^2$/g. The magnesium carbonate had a mercury intrusion volume of 2.3 cc/g and an average particle size of 6.7 μm. The magnesium carbonate powder was in the form of aggregates with a card-house structure.

The magnesium carbonate was used to produce a sheet (thickness: 1 mm). The sheet contained 3.5 parts by mass of the magnesium carbonate, 62.5 parts by mass of polyvinyl chloride (ZEST 1000, ShinDai-ichi Vinyl Corporation), 37.5 parts by mass of dioctyl phthalate, and 1.0 part by mass of lead stearate.

The sheet was prepared by the following procedure. All the ingredients were kneaded at 160° C. at 30 rpm for 150 seconds with Labo Plastomill (Toyo Seiki Seisaku-sho, Ltd.), and the kneaded product was taken out and press molded at 170° C. for 1 minute.

The sheet was subjected to the measurements and evaluations.

Example 2

A sheet was produced in the same manner as in Example 1 except that the amount of the magnesium carbonate was changed from 3.5 parts by mass to 4.7 parts by mass, and the sheet was subjected to the measurements and evaluations.

Example 3

A sheet was produced in the same manner as in Example 1 except that the amount of the magnesium carbonate was changed from 3.5 parts by mass to 9.3 parts by mass, and the sheet was subjected to the measurements and evaluations.

Example 4

A sheet was produced in the same manner as in Example 1 except that the amount of the magnesium carbonate was changed from 3.5 parts by mass to 14.0 parts by mass, and the sheet was subjected to the measurements and evaluations.

Example 5

A volume of 3 L of a magnesium hydroxide slurry (water slurry) containing 40 g/L MgO was warmed to 60° C., and carbon dioxide gas was blown into the stirred slurry at a flow rate of 2 L/min to allow a reaction to occur. The reaction was monitored to determine the end point. The end point was determined by adding phenolphthalein to the slurry. The end point was when the color of the slurry was changed from pink to colorless. After the reaction reached the end point, the blowing of the gas was stopped to give a basic magnesium carbonate slurry. The basic magnesium carbonate slurry was warmed to a liquid temperature of 70° C. and stirred at the temperature for 6 hours.

The basic magnesium carbonate slurry was dehydrated with a filter press at 2.5 MPa for 3 minutes, placed in a dryer set at 120° C. and dried for 12 hours. The dried product was pulverized with Bantam Mill (type AP-B) manufactured by Hosokawa Micron Corporation to give a basic magnesium carbonate powder.

The magnesium carbonate had a zeta potential of 9.2 mV and a BET specific surface area of 44 $m^2$/g. The magnesium carbonate had a mercury intrusion volume of 1.9 cc/g and an average particle size of 7.4 μm. The magnesium carbonate powder was in the form of aggregates with a card-house structure.

The magnesium carbonate was used to produce a sheet (thickness: 1 mm) in the same manner as in Example 1. The sheet contained 4.7 parts by mass of the magnesium carbonate, 62.5 parts by mass of polyvinyl chloride (ZEST 1000, ShinDai-ichi Vinyl Corporation), 37.5 parts by mass of dioctyl phthalate, and 1.0 part by mass of lead stearate.

The sheet was subjected to the measurements and evaluations.

Example 6

A volume of 3 L of a magnesium hydroxide slurry (water slurry) containing 40 g/L MgO was warmed to 55° C., and carbon dioxide gas was blown into the stirred slurry at a flow rate of 2 L/min to allow a reaction to occur. The reaction was monitored to determine the end point. The end point was determined by adding phenolphthalein to the slurry. The end point was when the color of the slurry was changed from pink to colorless. After the reaction reached the end point, the blowing of the gas was stopped to give a basic magnesium carbonate slurry.

The basic magnesium carbonate slurry was warmed to a liquid temperature of 70° C. and stirred at the temperature for 6 hours. The basic magnesium carbonate slurry was dehydrated with a filter press at 2.0 MPa for 3 minutes, placed in a dryer set at 120° C. and dried for 12 hours. The dried product was pulverized with Bantam Mill (type AP-B) manufactured by Hosokawa Micron Corporation to give a basic magnesium carbonate powder.

The magnesium carbonate had a zeta potential of 11.2 mV and a BET specific surface area of 57 $m^2/g$. The magnesium carbonate had a mercury intrusion volume of 3.0 cc/g and an average particle size of 6.8 μm. The magnesium carbonate powder was in the form of aggregates with a card-house structure.

The magnesium carbonate was used to produce a sheet (thickness: 1 mm) in the same manner as in Example 1. The sheet contained 4.7 parts by mass of the magnesium carbonate, 62.5 parts by mass of polyvinyl chloride (ZEST 1000, ShinDai-ichi Vinyl Corporation), 37.5 parts by mass of dioctyl phthalate, and 1.0 part by mass of lead stearate.

The sheet was subjected to the measurements and evaluations.

Example 7

A volume of 3 L of a magnesium hydroxide slurry (water slurry) containing 30 g/L MgO was warmed to 65° C., and carbon dioxide gas was blown into the stirred slurry at a flow rate of 2 L/min to allow a reaction to occur. The reaction was monitored to determine the end point. The end point was determined by adding phenolphthalein to the slurry. The end point was when the color of the slurry was changed from pink to colorless. After the reaction reached the end point, the blowing of the gas was stopped to give a basic magnesium carbonate slurry.

The basic magnesium carbonate slurry was warmed to a liquid temperature of 70° C. and stirred at the temperature for 9 hours. The basic magnesium carbonate slurry was dehydrated with a filter press at 2.5 MPa for 3 minutes, placed in a dryer set at 135° C. and dried for 12 hours. The dried product was pulverized with Bantam Mill (type AP-B) manufactured by Hosokawa Micron Corporation to give a basic magnesium carbonate powder.

The magnesium carbonate had a zeta potential of 18.7 mV and a BET specific surface area of 41 $m^2/g$. The magnesium carbonate had a mercury intrusion volume of 2.1 cc/g and an average particle size of 6.2 μm. The magnesium carbonate powder was in the form of aggregates with a card-house structure.

The magnesium carbonate was used to produce a sheet (thickness: 1 mm) in the same manner as in Example 1. The sheet contained 4.7 parts by mass of the magnesium carbonate, 62.5 parts by mass of polyvinyl chloride (ZEST 1000, ShinDai-ichi Vinyl Corporation), 37.5 parts by mass of dioctyl phthalate, and 1.0 part by mass of lead stearate.

The sheet was subjected to the measurements and evaluations.

Example 8

A magnesium oxide powder was added to pure water to a MgO concentration of 30 g/L to give 3 L of a slurry. The slurry was warmed to 60° C., and carbon dioxide gas was blown into the stirred slurry at a flow rate of 2 L/min to allow a reaction to occur. The reaction was monitored to determine the end point. The end point was determined by adding phenolphthalein to the slurry. The end point was when the color of the slurry was changed from pink to colorless. After the reaction reached the end point, the blowing of the gas was stopped to give a basic magnesium carbonate slurry. The basic magnesium carbonate slurry was warmed to a liquid temperature of 75° C. and stirred at the temperature for 6 hours.

The basic magnesium carbonate slurry was dehydrated with a filter press at 1.5 MPa for 3 minutes, placed in a dryer set at 120° C. and dried for 12 hours. The dried product was pulverized with Bantam Mill (type AP-B) manufactured by Hosokawa Micron Corporation to give a basic magnesium carbonate powder.

The magnesium carbonate had a zeta potential of 7.2 mV and a BET specific surface area of 48 $m^2/g$. The magnesium carbonate had a mercury intrusion volume of 3.0 cc/g and an average particle size of 9.9 μm. The magnesium carbonate powder was in the form of aggregates with a card-house structure.

The magnesium carbonate was used to produce a sheet (thickness: 1 mm). The sheet contained 4.7 parts by mass of the magnesium carbonate, 62.5 parts by mass of polyvinyl chloride (ZEST 1000, ShinDai-ichi Vinyl Corporation), 37.5 parts by mass of dioctyl phthalate, and 1.0 part by mass of lead stearate.

The sheet was prepared by the following procedure. All the ingredients were kneaded at 160° C. at 30 rpm for 150 seconds with Labo Plastomill (Toyo Seiki Seisaku-sho, Ltd.), and the kneaded product was taken out and press molded at 170° C. for 1 minute.

The sheet was subjected to the measurements and evaluations.

Example 9

A volume of 3 L of a magnesium hydroxide slurry (water slurry) containing 25 g/L MgO was warmed to 70° C., and carbon dioxide gas was blown into the stirred slurry at a flow rate of 3 L/min to allow a reaction to occur. The reaction was monitored to determine the end point. The end point was determined by adding phenolphthalein to the slurry. The end point was when the color of the slurry was changed from pink to colorless. After the reaction reached the end point, the blowing of the gas was stopped to give a basic magnesium carbonate slurry. The basic magnesium carbonate slurry was warmed to a liquid temperature of 80° C. and stirred at the temperature for 6 hours.

The basic magnesium carbonate slurry was dehydrated with a filter press at 2.5 MPa for 3 minutes, placed in a dryer set at 110° C. and dried for 12 hours. The dried product was pulverized with Bantam Mill (type AP-B) manufactured by Hosokawa Micron Corporation to give a basic magnesium carbonate powder.

The magnesium carbonate had a zeta potential of 10.8 mV and a BET specific surface area of 35 $m^2/g$. The magnesium carbonate had a mercury intrusion volume of 1.9 cc/g and an average particle size of 8.2 μm. The magnesium carbonate powder was in the form of aggregates with a card-house structure.

The magnesium carbonate was used to produce a sheet (thickness: 1 mm) in the same manner as in Example 1. The sheet contained 4.7 parts by mass of the magnesium carbonate, 62.5 parts by mass of polyvinyl chloride (ZEST 1000, ShinDai-ichi Vinyl Corporation), 37.5 parts by mass of dioctyl phthalate, and 1.0 part by mass of lead stearate.

The sheet was subjected to the measurements and evaluations.

Example 10

A volume of 3 L of a magnesium hydroxide slurry (water slurry) containing 40 g/L MgO was warmed to 55° C., and carbon dioxide gas was blown into the stirred slurry at a flow rate of 3 L/min to allow a reaction to occur. The reaction was monitored to determine the end point. The end point was determined by adding phenolphthalein to the slurry. The end point was when the color of the slurry was changed from pink to colorless. After the reaction reached the end point, the blowing of the gas was stopped to give a basic magnesium carbonate slurry. The basic magnesium carbonate slurry was warmed to a liquid temperature of 75° C. and stirred at the temperature for 6 hours.

The basic magnesium carbonate slurry was dehydrated with a filter press at 2.5 MPa for 3 minutes, placed in a dryer set at 120° C. and dried for 24 hours. The dried product was pulverized with Bantam Mill (type AP-B) manufactured by Hosokawa Micron Corporation to give a basic magnesium carbonate powder.

The magnesium carbonate had a zeta potential of 11.9 mV and a BET specific surface area of 59 m$^2$/g. The magnesium carbonate had a mercury intrusion volume of 2.2 cc/g and an average particle size of 3.8 μm. The magnesium carbonate powder was in the form of aggregates with a card-house structure.

The magnesium carbonate was used to produce a sheet (thickness: 1 mm) in the same manner as in Example 1. The sheet contained 4.7 parts by mass of the magnesium carbonate, 62.5 parts by mass of polyvinyl chloride (ZEST 1000, ShinDai-ichi Vinyl Corporation), 37.5 parts by mass of dioctyl phthalate, and 1.0 part by mass of lead stearate.

The sheet was subjected to the measurements and evaluations.

Reference Example 1

A volume of 3 L of a magnesium hydroxide slurry (water slurry) containing 40 g/L MgO was warmed to a liquid temperature of 65° C., and carbon dioxide gas was blown into the slurry at a flow rate of 2 L/min to allow a reaction to occur. The reaction was monitored to determine the end point. The end point was determined by adding phenolphthalein to the slurry. The end point was when the color of the slurry was changed from pink to colorless. After the reaction reached the end point, the blowing of the gas was stopped to give a basic magnesium carbonate slurry.

The basic magnesium carbonate slurry was warmed to a liquid temperature of 95° C. and stirred at the temperature for 6 hours. The basic magnesium carbonate slurry was dehydrated with a filter press at 1.5 MPa for 3 minutes, placed in a dryer set at 105° C. and dried for 12 hours. The dried product was pulverized with Bantam Mill (type AP-B) manufactured by Hosokawa Micron Corporation to give a basic magnesium carbonate powder.

The magnesium carbonate had a zeta potential of 6.8 mV and a BET specific surface area of 16 m$^2$/g. The magnesium carbonate had a mercury intrusion volume of 4.9 cc/g and an average particle size of 2.7 μm. The magnesium carbonate powder was in the form of aggregates with a card-house structure.

The magnesium carbonate was used to produce a sheet (thickness: 1 mm) in the same manner as in Example 1. The sheet contained 4.7 parts by mass of the magnesium carbonate, 62.5 parts by mass of polyvinyl chloride (ZEST 1000, ShinDai-ichi Vinyl Corporation), 37.5 parts by mass of dioctyl phthalate, and 1.0 part by mass of lead stearate.

The sheet was subjected to the measurements and evaluations.

Comparative Example 1

A sheet was produced in the same manner as in Example 1 except that no magnesium carbonate was used, and the sheet was subjected to the measurements and evaluations.

The results are summarized in the table below.

TABLE 1

| | | Example 1 | Example 2 | Example 3 | Example 4 | Example 5 | Example 6 | Example 7 | Example 8 | Example 9 | Example 10 | Reference Example 1 | Comparative Example 1 |
|---|---|---|---|---|---|---|---|---|---|---|---|---|---|
| Magnesium carbonate | Zeta potential (mV) | 12.4 | 12.4 | 12.4 | 12.4 | 9.2 | 11.2 | 18.7 | 7.2 | 10.8 | 11.9 | 6.8 | — |
| | BET specific surface area (m$^2$/g) | 42 | 42 | 42 | 42 | 44 | 57 | 41 | 48 | 35 | 59 | 16 | — |
| | Amount added (parts by mass) | 3.5 | 4.7 | 9.3 | 14.0 | 4.7 | 4.7 | 4.7 | 4.7 | 4.7 | 4.7 | 4.7 | 0 |
| Evaluations | Appearance of sheet | Excellent | Excellent | Excellent | Excellent | Excellent | Excellent | Excellent | Excellent | Excellent | Excellent | Good | Excellent |
| | L* value | 43.8 | 44.0 | 51.1 | 58.2 | 48.0 | 49.2 | 51.2 | 48.2 | 49.1 | 50.4 | 55.2 | 43.5 |
| | 100% Modulus (kgf/cm$^2$) | 0.54 | 0.55 | 0.58 | 0.59 | 0.55 | 0.56 | 0.55 | 0.56 | 0.56 | 0.55 | 0.56 | 0.52 |

1000, ShinDai-ichi Vinyl Corporation), 37.5 parts by mass of dioctyl phthalate, and 1.0 part by mass of lead stearate.

The sheet was subjected to the measurements and evaluations.

As is apparent from the results in the table, addition of the magnesium carbonates of Examples increases strength and rigidity of the sheets and maintains high transparency of the sheets.

Example 11

The magnesium carbonate prepared in Example 1 was used to produce a sheet (thickness: 2 mm) as described below. The sheet contained 120.0 parts by mass of the magnesium carbonate, 100 parts by mass of natural rubber (pale crepe), 1.0 part by mass of stearic acid, 2.0 parts by mass of sulfur, 1.5 parts by mass of zinc carbonate, and 1.2 parts by mass of a vulcanization accelerator (containing 0.2 parts by weight of Nocceler TS, 0.5 parts by weight of Nocceler H, and 0.5 parts by weight of Nocceler P, each manufactured by Ouchi Shinko Chemical Industrial Co., Ltd.).

The natural rubber was masticated on rollers at a rotation speed of 10 rpm at 30° C. for 5 minutes. Stearic acid, the magnesium carbonate, sulfur and zinc carbonate were added, and the mixture was kneaded for 30 minutes. The vulcanization accelerator was added, the mixture was kneaded, and the roller clearance was varied to give a rubber composition of about 3 mm thickness. The rubber composition was allowed to stand for 12 hours and then placed in a cool and dark place for 18 hours. The rubber composition was press molded at 155° C. for 10 minutes to give a sheet of 2 mm thickness.

The sheet was subjected to the measurements and evaluations.

Example 12

A sheet was produced in the same manner as in Example 11 except that the magnesium carbonate of Example 5 was used in place of the magnesium carbonate of Example 1, and the sheet was subjected to the measurements and evaluations.

Example 13

A sheet was produced in the same manner as in Example 11 except that the magnesium carbonate of Example 6 was used in place of the magnesium carbonate of Example 1, and the sheet was subjected to the measurements and evaluations.

Example 14

A sheet was produced in the same manner as in Example 11 except that the magnesium carbonate of Example 7 was used in place of the magnesium carbonate of Example 1, and the sheet was subjected to the measurements and evaluations.

Example 15

A sheet was produced in the same manner as in Example 11 except that the magnesium carbonate of Example 8 was used in place of the magnesium carbonate of Example 1, and the sheet was subjected to the measurements and evaluations.

Example 16

A sheet was produced in the same manner as in Example 11 except that the magnesium carbonate of Example 9 was used in place of the magnesium carbonate of Example 1, and the sheet was subjected to the measurements and evaluations.

Example 17

A sheet was produced in the same manner as in Example 11 except that the magnesium carbonate of Example 10 was used in place of the magnesium carbonate of Example 1, and the sheet was subjected to the measurements and evaluations.

Reference Example 2

A sheet was produced in the same manner as in Example 11 except that the magnesium carbonate of Reference Example 1 was used in place of the magnesium carbonate of Example 1, and the sheet was subjected to the measurements and evaluations.

Comparative Example 2

A sheet was produced in the same manner as in Example 11 except that no magnesium carbonate was used, and the sheet was subjected to the measurements and evaluations.

The results are summarized in the table below.

TABLE 2

|  |  | Example 11 | Example 12 | Example 13 | Example 14 | Example 15 | Example 16 | Example 17 | Reference Example 2 | Comparative Example 2 |
|---|---|---|---|---|---|---|---|---|---|---|
| Magnesium carbonate | Zeta potential (mV) | 12.4 | 9.2 | 11.2 | 18.7 | 7.2 | 10.8 | 11.9 | 6.8 | — |
|  | BET specific surface area ($m^2/g$) | 42 | 44 | 57 | 41 | 48 | 35 | 59 | 16 | — |
| Evaluations | Transparency of sheet | Excellent | Excellent | Excellent | Excellent | Excellent | Excellent | Excellent | Good | Excellent |
|  | Hardness | 57 | 58 | 58 | 58 | 58 | 57 | 58 | 58 | 37 |

As is apparent from the results in the table, addition of the magnesium carbonates of Examples to a rubber increases strength and rigidity of the sheets and maintains high transparency of the sheets, which results were similar to those observed above. The results indicate that the magnesium carbonates of Examples can be used to increase strength and rigidity of various types of resins while maintaining high transparency of the resins.

INDUSTRIAL APPLICABILITY

The present invention provides a novel magnesium carbonate. The magnesium carbonate is suitable as, for example, a resin additive [including a filler (a bulking agent or a reinforcement)] etc.

The invention claimed is:

1. A magnesium carbonate having a zeta potential of 6 to 25 mV and a BET specific surface area of 28 $m^2/g$ or more in the form of aggregates with a card-house structure.

2. The magnesium carbonate according to claim 1, which has a mercury intrusion volume of 1 to 8 cc/g.

3. The magnesium carbonate according to claim 1, which has an average particle size of 1 to 20 μm.

4. The magnesium carbonate according to claim 1, wherein the zeta potential is 7 to 20 mV, the BET specific surface area is 30 to 70 $m^2/g$, the mercury intrusion volume is 1.5 to 5 cc/g, and the average particle size is 2 to 15 μm.

5. The magnesium carbonate according to claim 1, which is a resin additive.

6. A composition comprising a resin and the magnesium carbonate according to claim 1.

7. The composition according to claim 6, wherein the resin comprises a vinyl chloride resin.

8. The composition according to claim 6, wherein the resin comprises a rubber.

9. The composition according to claim 6, wherein the proportion of the magnesium carbonate is 0.1 part by mass or more based on 100 parts by mass of the resin.

10. The magnesium carbonate according to claim 1, wherein the BET specific surface area is 28 to 65 $m^2/g$.

* * * * *